No. 734,678. Patented July 28, 1903.

UNITED STATES PATENT OFFICE.

ALMO DE MONCO, OF DENVER, COLORADO.

COMPOSITION OF MATTER FOR CEMENT-PLASTER.

SPECIFICATION forming part of Letters Patent No. 734,678, dated July 28, 1903.

Application filed February 24, 1903. Serial No. 144,736. (No specimens.)

*To all whom it may concern:*

Be it known that I, ALMO DE MONCO, a citizen of the United States of America, residing in the city and county of Denver and State of Colorado, have invented certain new and useful Improvements in Composition of Matter for Cement-Plaster; and I do declare the following to be a full, clear, and exact description of the invention, such as will enable others skilled in the art to which it appertains to make and use the same.

My invention relates to a new composition of matter for cement-plaster to be used for plastering the interior and exterior walls and ceilings of buildings, also for the manufacture of building-blocks, bricks, slabs, panels, and architectural ornaments, such as columns, caps, moldings, and decorative panels.

My improved cement-plaster can be troweled easily and will set evenly and uniformly without shrinking or cracking. It possesses in its pulp form an inherent tenacity that will permit it to flow in thick or thin layers in a body before a trowel and will permanently set evenly in widely-spaced clenching slots or apertures and will adhere firmly to stone, brick, or wooden surfaces. After it has been applied to walls or ceilings and has dried and after it has been made into building-blocks, bricks, or into architectural moldings or ornaments it is so tough and pliable that it can be sawed or cut, as desired, and nails or screws can be driven into it, and if it receives severe blows from any source it will be indented, but will not crack or crumble. It is also a non-conductor of electricity and sound and also of heat and cold and is also fireproof, and after it has dried in walls or in the various articles it can be made into should it get soaked with water it will dry without injury to its surface, form, or color.

My composition cement-plaster consists of the following ingredients, combined in the proportions stated, and, assuming that all the measures are made by avoirdupois weight and that a ton of two thousand pounds is taken as the unit of volume, consists of clay, (aluminous flint-clay,) seven hundred and fifty-six pounds and silicious soft clay, three hundred and seventy-seven and one-third pounds, making eleven hundred and thirty-three and one-third pounds; plaster-of-paris, (white or blue,) pulverized and burned, eight hundred and sixty-six and two-thirds pounds; total, one ton of two thousand pounds.

The above proportions are those I preferably use; but I have discovered by experience that these proportions can be varied considerably and a very superior quality of cement-plaster can still be made, and my invention contemplates a cement-plaster in which the relative proportions of the ingredients used may be varied as follows: clay, (of the kinds specified in any suitable proportions, but as a whole,) from about three hundred to fourteen hundred pounds, but preferably eleven hundred and thirty-three and one-third pounds; plaster-of-paris, (white or blue, pulverized and burned,) from about three hundred to twelve hundred pounds, but preferably eight hundred and sixty-six and two-thirds pounds; or if proportioned on a percentage basis, assuming two thousand to be the unit, then: clay, aluminous and silicious in the proportion of two-thirds and one-third, respectively, from about seventeen and one-half to seventy per cent., but preferably about fifty-six and one-fourth per cent.; plaster-of-paris, (either white or blue,) burned and ground, from fifteen to forty-five per cent., but preferably forty-three and three-fourths per cent. These ingredients are to be thoroughly pulverized, mixed, and mingled together into a dry powder and when ready for use are to be mixed with sufficient water to form a suitable cement-plaster pulp. This cement-plaster pulp is applied with a trowel to walls and ceilings of buildings and is to be formed by suitable molds and dies, either with or without pressure into building-blocks, bricks, and architectural ornaments.

My improved cement-plaster is composed of ingredients that cost but a trifle and that can be easily obtained, thus enabling it to be used in the construction of all grades of buildings from the cheapest to the most expensive. It finishes to a very smooth surface in one coat, and walls and ceilings finish to a smooth and glassy surface, or it may be stippled to a fine stippled finish.

My cement-plaster will protect wood and iron from fire when they are completely covered with it.

One of the most valuable features of my cement-plaster is that it will permanently carry paints and tints of all colors without their losing their brilliancy by fading, and it will not cause paints and tints to crack or peel off or burn, and it is not necessary to previously size or varnish the cement-plaster before applying tints, paints, or paper.

My improved composition cement-plaster is manufactured in a dry powdered state and can be shipped in barrels or sacks to distant points. Coloring-matter may be mixed with it in its powdered form or when it is being mixed with water into a cement pulp, so that walls, ceilings, and all articles made with it may be made of desired colors.

My improved composition cement-plaster when composed of the ingredients named and when made in the approximate percentages specified makes a cement-plaster containing all the qualities and advantages herein enumerated. The clay acts as the base of my cement-plaster and is the main binding agent and also gives toughness and plasticity to it. The burned plaster-of-paris assists in setting and hardening the mass and gives to the cement-plaster a fine glassy surface when properly troweled.

For all general uses I make the cement-plaster as above specified. There are, however, some special uses to which the plaster may be applied where an additional retarding and binding agent is desirable. In such cases I employ any of the commonly used retarding and binding agents—such as hemp, jute, or asbestos fiber—for a binder and retarder, and aside from these any special retarding agent may be used and is recommended.

By varying the proportions of the two ingredients of which my cement-plaster is composed I am enabled to make different grades of cement-plaster and in doing this proportion the several grades so that each grade is more especially adapted to special classes of work than the others, it being understood that I do not confine myself to the combination of ingredients named, as my invention contemplates the use of the ingredients or their equivalents which will when combined produce a cement-plaster having the characteristics above set forth.

What I claim, and desire to secure by Letters Patent of the United States, is—

1. The herein-described composition of matter consisting of aluminous flint-clay, silicious clay and plaster-of-paris in substantially the proportions stated, substantially as described.

2. The herein-described composition of cement-plaster, consisting of aluminous flint and silicious clays, plaster-of-paris and coloring-matter, substantially as described.

3. The herein-described composition of matter consisting of aluminous flint and silicious clay, plaster-of-paris and a binding and retarding agent such as animal, vegetable, or mineral fiber, substantially as described.

4. The herein-described composition of matter consisting of aluminous flint-clay, silicious clay, plaster-of-paris and any suitable chemical retarding agent, substantially as described.

In testimony whereof I affix my signature in presence of two witnesses.

ALMO DE MONCO.

Witnesses:
BESSIE THOMPSON,
G. SARGENT ELLIOTT.